United States Patent Office 2,835,585
Patented May 20, 1958

2,835,585

CHOCOLATE PRODUCT AND PROCESS THEREFOR

Irving I. Rusoff, Newark, N. J., assignor to General Foods Corporation, New York, N. Y., a corporation of Delaware No Drawing. Application July 10, 1953
Serial No. 367,350

8 Claims. (Cl. 99—23)

The present invention relates to cacao products and to a process for producing the same, particularly to a water-soluble flavor concentrate having the full-bodied chocolate flavor and aroma and to a process for obtaining the same.

Generally, in preparing chocolate flavored beverages, such as chocolate milk and carbonated or non-carbonated chocolate drinks, the chocolate flavor is imparted to the beverage by using a low-fat cacao material, such as cocoa powder. At best, it provides a turbid product and, therefore, its use is mainly confined to milk. Even then it presents a problem in that some of the cocoa particles settle out and collect on the bottom of the bottle or other container in the form of a sediment. Many proposals have been advanced for dealing with the problem. For example, it has been suggested that gelatinized starches, such as arrowroot, sago, and the like, be added to the beverage to hinder settling of the insoluble particles. Other suggested additives have included gelatin, pectin and various vegetable gums. Of these materials the vegetable gums have attained a more widespread use than have the other materials. Examples of some of the gums which have been used include gum tragacanth, gum arabic, gum karaya, agar-agar and Irish moss, of which Irish moss, with or without the addition of starch, has been most favored. However, none of the above mentioned proposals have resulted in a satisfactory solution to the problem due to the foreign taste, increased viscosity, and in some cases the sliminess caused in the product by the additives.

On the other hand, attempts have been made to prepare water-soluble products containing the full-bodied chocolate flavor and aroma. Difficulty is had with the separation of the water-soluble materials from the roasted cacao material, particularly from the fat, the hemicellulose and the starch content. Attempts have been made to use high temperatures for the purpose of hydrolyzing the hemicelluloses and gelatinizing the starch so that the same may be ultimately converted to water-soluble sugars. This has mainly served to deteriorate the flavor and remove practically all of the aroma from the product, the problem of separating the water extract from the fat remaining. Thus, such water extracts are possessed of only inferior flavor and aroma and although efforts have been made to concentrate the extracts they are still weak with regard to flavor. Such heat treatment serves mainly to demonstrate the susceptibility of the chocolate flavor and aroma to deterioration at high temperatures. For this reason the extract is not dried, but is usually handled as a concentrated solution. This introduces the possibility of bacterial spoilage as still another disadvantage.

It is an object of the present invention to provide a flavoring material which possesses the full-bodied chocolate flavor and aroma and is quickly, completely and highly soluble in water so as to be satisfactory for general flavoring purposes.

A further object is to provide such a water-soluble chocolate flavoring concentrate.

A still further object is to provide a chocolate flavoring material which may be reacted with chemical agents to alter color and flavor without the development of off-flavors.

A still further object is to provide a process whereby the above-described chocolate flavoring material may be provided without detriment to the residual, extracted cacao material from which it was derived.

Another object is to provide a process which achieves substantially complete extraction of the chocolate flavor and aroma from the cacao beans.

Still another object is to provide a process which permits the removal of the chocolate flavor and aroma so that the remaining components of the cacao bean may be treated for the development or removal of color and for various other purposes without any detrimental effect on the chocolate flavor and aroma.

These and other objects will become apparent from the following detailed description.

It has now been discovered that a flavoring material containing the full-bodied chocolate flavor and aroma which is completely, quickly and highly soluble in water and other aqueous liquids may be provided by extracting unroasted cacao beans and other cacao materials with an aqueous solvent, removing the solvent by distillation or evaporation and then heat treating or roasting the extract to develop the characteristic chocolate flavor and aroma. In addition to providing a method whereby the chocolate flavor and aroma may be removed from the cacao material with attendant advantages concerning its use, the discovery with which the present invention is concerned also provides for particular advantages with regard to processing the residual cacao material from which the flavoring constituents have been removed in that the residue may be processed however drastically may be desired without in any way impairing the flavor.

The characteristic chocolate flavor and aroma is not present in green or unroasted cacao beans and other cacao materials but requires roasting for its development. Apparently the roasting temperatures, which are generally within the range of 230°–285° F., bring about certain changes in certain of the cacao constituents with the result that the flavor and aroma are developed. Such constituents are commonly referred to as flavor and aroma precursors.

One of the primary discoveries upon which the process of the present invention is based is that the flavor and aroma precursors are water-soluble and may be extracted from the cacao material. An equally important discovery is that such extractives or precursors may be roasted apart from the rest of the cacao material with the development of the full-bodied chocolate flavor and aroma.

Further, it has been found that conditions more drastic than those used to extract the flavor and aroma from a roasted chocolate material can be employed in extracting these precursors. The ability of the precursors to withstand high temperatures and remain substantially unchanged is dependent on the amount of water in the extract. When the concentration of precursors in the extract is less than 50% the extract can be subjected to temperatures within the normal roasting range, that is, from 190° F. to 350° F. with substantially no change or flavor development taking place. Therefore, water at temperatures within this range may be used to extract the precursors with complete extraction and without deterioration of the flavor producing constituents of the cacao material.

Moreover, the extract can be dried to a powder at temperatures below roasting temperatures without in any way harming the flavor and aroma precursors, thus providing the convenience of a powder with regard to storage, handling, stability, and the like.

Also, the extract may be treated with solvents such as chloroform or trichlorethylene to selectively remove the alkaloid, fat or other undesirable content of the extract and there is no detriment to the flavor and aroma. Theobromine, caffeine and other alkaloids normally present in chocolate materials are considered objectionable in some uses of chocolate and this presents a convenient method for their removal, the flavor being reincorporated into the residue from the original extraction or used as such. Removal of fat insures complete solubility for the flavor extract.

The unroasted chocolate materials to which the process of the present invention can be applied consist of all types and varieties of fermented or cured cacao beans of any form. For an example of curing, see U. S. Patent No. 2,558,845. The preferred form of the cacao material used in the extraction is broken beans which result from passing whole beans through a cracker to break up the bean and then a fanning device to remove shell particles. However, any form of cacao, as mentioned above, from whole beans to finely ground beans can be used in the process. Although fat extracted beans may be used, it is unnecessary to extract the cocoa butter prior to extraction of flavor precursors.

Extraction of the chocolate precursors from the unroasted cacao can be accomplished over a wide range of temperatures. It has been found that some degree of extraction can be obtained employing extraction temperatures ranging from the temperature of ice water, say 35° F., to temperatures as high as 400° F. and above. It is preferred, however, for practical reasons to use extraction temperatures from about 175° F. to about 325° F., and still more preferred to operate at about 300° F. At temperatures below 175° F. the rate of extraction is too low for efficient commercial operation, although the resulting extract is of high quality. Extraction temperatures substantially in excess of 325° F. may result in a higher yield of soluble solids but the aroma and flavor of these solids are often of an inferior quality.

Another factor to be considered in the process of the present invention is the length of time required for extraction of the cacao material. This is variously influenced by the other factors in the process. A relatively high temperature of extraction would require a shorter time and vice versa to obtain maximum yields of extract. Within limits, an increase in extracting time results in an increase in the yield of final dry extract. With the weight ratio of water to cacao material of 5:1 and an extraction temperature of 140° F., extraction for 4 hours gives about an 18% increase in yield of extracted solids over a 2 hour extraction under otherwise identical conditions. The extraction is substantially exhaustive for this temperature after 4 hours. No flavor differences in the final product are found between the two extracts. At 300° F., the preferred temperature of extraction, substantially complete extraction is obtained after about 30 minutes. At higher extraction temperatures the use of excessively long periods of time for extraction may give rise to off-flavors and should be avoided.

The weight ratio of the solvent to the cacao material being extracted may be varied according to the time and temperature of extraction and the yield desired. It is preferred to use an amount of water or other aqueous solvent which is about 5 times the weight of the cacao material since this provides for most economical commercial operation under usual conditions of temperature and time of extraction.

Another factor to be considered in connection with the extraction is the degree of subdivision of the cacao beans or other cacao material. Needless to say, to some extent subdivision facilitates the extraction. However, if the cacao material is subdivided to a great degree difficulty can be expected with regard to the subsequent separation of the aqueous extract. This difficulty could require the use of filter aids which, of course, would be objectionable as far as the subsequent use of the residual extracted cacao material is concerned. It has been found that the optimum degree of subdivision is represented by that of the broken beans and, accordingly, their use is preferred. In such a case it is preferred also to employ percolation extraction techniques, which are described in detail in Example 1 below. While the use of percolation offers advantages, particularly in separating the extract from the residual cacao material and in obtaining an extract of high initial concentration, various other methods for extraction may be employed with good advantage. Such other methods involve the use of a horizontal revolving extracting reel through which the solvent and cacao material may be passed cocurrently or countercurrently with respect to each other. Also, extraction kettles may be employed if a batch operation is desired. Although the use of the percolation technique, as mentioned above, serves to partially filter the cacao materials from the aqueous extract, it may be necessary to follow up the percolation with a clarification step. Moreover, the other methods of extraction employed required a filtration step. Such filtration may be effected by any conventional means such as a plate and frame filter, a filter wheel and, of course, a centrifuge may be employed if desired. Also, suction or reduced pressure may be employed as well as pressure, if desired.

Generally, the concentration of solids in the extract of cacao material obtained in accordance with the present invention is 2–6%. This must be concentrated in order to effect the subsequent roasting step. Any temperature and pressure combination that may be desired can be used to a point where the extract is about 50% soluble solids. At this point care should be taken since the development of the flavor and aroma is believed possible at this moisture content, although it occurs only to a slight degree.

By the time the concentration has proceeded to a point where the residue contains 20–30% moisture the development of flavor and aroma begins to occur to a much greater degree so that care must be taken in connection with the conditions used for concentration, particularly temperature and vacuum. The use of extremely high temperatures, for example, would serve to deteriorate the flavor and drive off the aroma, while the use of reduced pressure would remove aroma. However, the major development of the flavor and aroma occurs when the concentrate is in a substantially dry condition and is being subjected to roasting temperatures, so that the aforementioned precautions relate to the loss of flavor and aroma during concentration and are not of critical importance.

The use of freeze-drying or lyophilization is, of course, a very convenient method for avoiding all of the above discussed difficulties with concentration. Generally, a 30% solution may be freeze-dried to a point where the extract contains only 1–10% moisture. Roasting is then easily effected without any fear of losing flavor and aroma. On the other hand, the lyophilization technique is generally an expensive one and it is preferred from a standpoint of economy to use controlled methods of heat evaporation.

Roasting is achieved by subjecting the soluble solids of the extract to a temperature from about 190° F. to about 350° F. for periods of time up to about 17 hours. Some additional chocolate flavor is developed in extracted solids roasted for the longer periods at 190° F., but such is not very significant. The time and temperature required to properly develop chocolate flavor and aroma in the soluble solids of the extract depends on the method and apparatus used. One preferred method of roasting involves remoistening of the dried extract by addition of 25% water, spreading the material in a thin film on a stainless steel tray, evaporating the material to about 5% moisture over a steam bath and thereafter subjecting the material to roasting temperatures. When this method is employed temperatures of from about 250° F. to about 285° F. for periods of time from about 12 minutes to about 3 minutes respectively are preferred.

A further preferred method of roasting involves combined drying and roasting of the liquid extract by spray drying procedures as described in detail in Example 2. With inlet air temperatures of 650°–675° F. and outlet gas temperatures between 280° F. and 300° F. satisfactory flavor and aroma are developed. It is thought, however, that the product temperature seldom rises above 200° F. under these conditions and the time of exposure to these temperatures is of the order of from 20–30 seconds.

The development of flavor and aroma in the extract appears to require that the material be substantially free from moisture at the time of roasting. However, it may be convenient to subject the extract to roasting temperatures when the moisture content has been reduced to as little as from 30–50% since it is believed that some of the development of flavor and aroma begins to occur at such relatively high moisture levels. Moreover, there is some reason to believe that a different and perhaps preferred flavor and aroma is developed when the material subjected to roasting temperatures has an appreciable water content at the beginning of the roasting step.

The pressure under which the extract is roasted seems to have little influence on the amount or rate of flavor development. It is generally convenient to roast the extract open to the atmosphere to allow any moisture present to escape. If desired, however, comparable flavor development may be had by roasting in closed containers under varying pressures depending on the size of the container, the temperature, and the amount of moisture present.

The drying and roasting can be combined into a single step by means of spray drying at such a temperature that drying and roasting is achieved in the same operation. An indication of the conditions needed during spray drying is set forth in Example 2 below. This process offers an opportunity to include other materials along with the solids of the extract to serve as carriers of the flavor. Examples of these carrying materials are sucrose, dextrose, corn sugar, soluble starches, various vegetable gums, and the like. The same effect can be achieved by drum drying or pan drying.

The dry powder thus obtained has a high degree of solubility and is rapidly soluble in water and other aqueous liquids. At the level of from 7.5 to 10 grams per liter of milk, the material is quickly and completely soluble at room temperature. Also, 4 grams of roasted extract may be dissolved in 105 ml. of water with the addition of 56 grams of sucrose to make a concentrated chocolate flavored syrup.

As a further step in the processing of said chocolate flavoring material, treatment with alkali may be incorporated to give a product with a flavor and appearance of dutched chocolate. This dutching step may be carried out by treating the extract, either before or after roasting, with a mild alkali, such as 1–2.5% of sodium carbonate, potassium carbonate or sodium hydroxide, such as is customary with regular chocolate material.

The residue which remains after the extraction is completed may be dried and roasted to provide a chocolate liquor of bland flavor which may be used to advantage in blending with other chocolate liquors to produce chocolate coatings. Alternatively, the extracted nibs may be dried and pressed to remove the cocoa butter and provide a press cake which on grinding results in a cocoa powder which, in turn, may be mixed with sucrose to provide a breakfast cocoa type of product.

Another important use of the extracted nibs is that they may be treated with various chemical agents to change the color of the chocolate liquors made therefrom without significantly changing the flavor of the final product. For example, hydrogen peroxide may be used to make a light colored chocolate liquor. When regular cacao material is so treated serious off-flavors develop. It has been found that such treatment does not develop off-flavors in the residual extracted cacao material provided by this process and that a light colored chocolate liquor suitable for blending with darker chocolate liquors may be made. As an example of the treatment, finely divided, extracted nibs which had been roasted were treated with about 30% of their weight of hydrogen peroxide for about 24 hours at 60° C. The chocolate liquor prepared from these nibs had a reflectance reading of 118 relative to magnesium oxide having a reading of 600 using a photoelectric colorimeter with a green filter. By way of comparison, milk chocolate gives a reading of about 73, and dark, sweet chocolate liquor gives a reading of approximately 29. No difference in flavor was found between liquors prepared from extracted nibs which had been bleached and those not bleached. Other bleaching agents such as other peroxides and peracetic acid and other peracids and the like which completely break down during the treatment and whose breakdown products are non-toxic may also be used to lighten the color of such liquors.

Exposure of ordinary cacao material to a strong acid, such as hydrochloric acid, gives a strong red color to the resulting liquor. However, off-flavors also develop. As with the bleaching agents discussed above the residual extracted cacao material of this process may be treated, for example, with 3% hydrochloric acid for 3 minutes at 60° C. to provide a product with substantially no off-flavors and with a strong red color which may be blended to advantage with other liquors. Similarly, dutching or treatment of the residual extracted cacao material with mild alkali, such as from 1 to 2½% potassium or sodium carbonate or sodium hydroxide, results in a liquor of very dark color. This material so treated may then be blended with other liquors to produce any desired results.

A still further modification is to reincorporate the dry powdered extract of this invention into a liquor made from the dried, roasted, extracted cacao material, the latter either in its normal state or having been chemically modified as described above. In this manner it is possible to modify the color or other characteristics of the chocolate without deteriorating its flavor or producing undesirable off-flavors.

Additionally, if it is desired to obtain the dry chocolate flavor concentrate of this invention having the color of dutched or alkali treated chocolate, the process may be divided into two stages. The first stage is the regular extraction of the flavor precursors from the cacao material followed by drying and roasting as described above. The second stage is a dutching of the extracted nibs for a time sufficient to develop the color desired followed by a second extraction of the cacao material to remove the colored material which is then dried and added to the dried flavor extract. The desired color is thereby provided and at the same time a large part of the dutched flavor is avoided.

It is obvious that other flavor and/or taste ingredients may be added to the extract of chocolate precursors prior to roasting in order to achieve various flavor nuances and that although the preferred embodiment of the cacao extract of this invention is a dry powder, this powder may be partially reconstituted with water and used as a concentrated liquid extract for flavoring purposes.

In order to further illustrate the process and product of this invention, the following detailed examples are set forth.

*Example 1*

Fermented, unroasted Accra cacao beans are cracked and fanned in order to break the beans and to remove the shell. Fifteen pounds of these broken beans are placed in an insulated 3-inch I. D. stainless steel pipe 10 feet in length and mounted vertically with a water inlet at the bottom and with an outlet for removal of the extract at the top of the column. Appropriate retaining screens at each end of the pipe reduce the effective length of the column to approximately 9 feet 6 inches. The cacao is then extracted by admitting the water at 200° F. into the bottom of the column at the rate of .085 gallon per minute and causing the water to move upwardly through the beans, the extract being drawn off at the top. The rate of flow of the water through the column is regulated to maintain the desired temperature within the column. Extraction for one hour in this manner removes substantially all of the available soluble solids and results in about 75 pounds of aqueous extract or solution containing about 1.5 pounds of extracted cacao material.

Concentration of the extract is carried out in a steam jacketed kettle at 212° F. until the solution contains approximately 30% soluble solids. The remaining water is then removed from the concentrate by freeze drying in order that the solids may be stored without change.

For the roasting step the dry extract is remoistened by addition of 25% water and spread in an even layer approximately ¼ inch thick on a stainless steel tray. This tray is then placed in an oven at 285° F. and the material allowed to roast for 3 minutes. Following roasting the material is allowed to cool and is removed from the tray by scraping. The process yield is approximately 1.45 pounds of a dried, roasted extract which contains less than .3% fat.

Two grams of the dried material are dissolved along with 18 grams of sugar and 200 grams of cold milk. The resulting beverage has an excellent chocolate flavor and aroma.

*Example 2*

Fermented, unroasted Accra cacao beans are broken as described in Example 1. Ninety-six pounds of these broken beans are extracted in the same manner as Example 1 using water at a temperature of about 300° F. Six runs using a single column are required. The water extract is obtained at an average concentration of about 7.6% solids and is concentrated in a pot still at 125° F. and a vacuum of 25 inches until the solution contains about 30% solids. The liquid concentrate is then spray dried in a Western Precipitation Company Type N spray dryer. This dryer is approximately 8 feet high and 3 feet in diameter and is of the double cone type. The drying conditions are adjusted so as to achieve drying and roasting of the extract in the same operation. Air temperature at the inlet varies between 650° and 675° F. while the outlet temperature is from 280°–300° F. An air flow rate through the dryer of 160 cubic ft./minute at standard conditions is used. The pump pressure (liquid) is 3 lbs./square inch (gauge) and air pressure at the fluid nozzle is 20–25 lbs./square inch (guage) using a Spray System pneumatic atomizing nozzle (¼ J–SS). The density of the dry roasted powder obtained is 0.15 gm./cc. The fat content of the roasted product is .25%. Process yield is 15 pounds of a dry concentrated extract.

A portion of the powder prepared above is incorporated as a flavoring ingredient in a carbonated beverage and evaluated as to taste and appearance. The beverage is clear and has a good chocolate flavor and aroma. No sediment develops in the bottom of the bottle.

It will be understood that while the invention has been described with particular reference to the above examples, the invention is not necessarily limited thereto. Reference should therefore be had to the appended claims for a definition of the limits of the invention.

What is claimed is:

1. A process for preparing a chocolate flavoring material which comprises contacting fermented unroasted cacao material containing precursors of chocolate flavor and aroma with an aqueous extraction liquid whereby said precursors are extracted from said unroasted cacao material and pass into said liquid to form an aqueous extract, separating from the cacao material the said extract containing soluble precursors of chocolate flavor and aroma, evaporating the aqueous extract to form a semi-solid mass, and roasting this mass to develop chocolate flavor and aroma.

2. A process for preparing a chocolate flavoring material which comprises contacting fermented unroasted cacao material containing precursors of chocolate flavor and aroma with an aqueous extraction liquid at 175° F.–325° F. whereby said precursors are extracted from said unroasted cacao material and pass into said liquid to form an aqueous extract, separating from the cacao material the said extract containing soluble precursors of chocolate flavor and aroma, evaporating the aqueous extract to form a semi-solid mass, and roasting this mass to develop chocolate flavor and aroma.

3. A process for preparing a chocolate flavoring material which comprises contacting fermented unroasted cacao material containing precursors of chocolate flavor and aroma with an aqueous extraction liquid at 175° F.–325° F. whereby said precursors are extracted and pass into said liquid to form an aqueous extract, separating from the cacao material the said extract containing soluble precursors of chocolate flavor and aroma, concentrating said extract to moisture content of less than 50%, evaporating to dryness and roasting said concentrated extract at 190° F.–350° F. to develop chocolate flavor and aroma.

4. A process for preparing a chocolate flavoring material which comprises contacting fermented unroasted cacao material containing precursors of chocolate flavor and aroma with an aqueous extraction liquid at 175° F.–325° F. whereby said precursors are extracted and pass into said liquid to form an aqueous extract, separating from the cacao material the said extract containing soluble precursors of chocolate flavor and aroma, and spray drying said extract to produce said precursors in a semi-solid state at a temperature falling within the range 190° F.–350° F. to roast said separated precursors and thereby develop chocolate flavor and aroma.

5. A water-soluble chocolate flavoring material characterized by high level and rapid rate of solubility and a full-bodied chocolate flavor and aroma prepared by the process comprising contacting fermented unroasted cacao material containing precursors of chocolate flavor and aroma with an aqueous extraction liquid whereby said precursors are extracted from said unroasted cacao material and pass into said liquid to form an aqueous extract, separating from the cacao material the said extract containing soluble precursors of chocolate flavor and aroma, evaporating the aqueous extract to form a semi-solid mass, and roasting the separated precursors to develop chocolate flavor and aroma thereby forming a water-soluble chocolate flavoring material.

6. A process for preparing a chocolate flavoring material which comprises percolating an aqueous extraction liquid through an elongated column of fermented, unroasted cacao material containing precursors of chocolate flavor and aroma whereby said precursors are extracted from said unroasted cacao material and pass into said liquid to form an aqueous extract, separating from the cacao material the said extract containing soluble precursors of chocolate flavor and aroma, evaporating the aqueous extract to form a semi-solid mass, and roasting this mass to develop the chocolate flavor and aroma.

7. A process for preparing a chocolate flavoring material which comprises contacting fermented, unroasted cacao material containing precursors of chocolate flavor and aroma with an aqueous extraction liquid at 175°–325° F., whereby said precursors are extracted and pass into said liquid to form an aqueous extract, separating from the cacao material the said extract containing soluble precursors of chocolate flavor and aroma, concentrating said extract to moisture content of less than 50%, evaporating the concentrated extract at a temperature substantially below its roasting temperature to form a semi-solid mass, and roasting said semi-solid mass at 230°–285° F. to develop the chocolate flavor and aroma.

8. A process for preparing a chocolate flavoring material which comprises contacting fermented, unroasted cacao material containing precursors of chocolate flavor and aroma with hot water, whereby said precursors are extracted and pass into said water to form an aqueous extract, separating from the cacao material the said extract containing soluble precursors of chocolate flavor and aroma, concentrating said extract to moisture content of less than 50% by heating, freeze drying the concentrated extract to form a semi-solid mass, and roasting said mass to develop the chocolate flavor and aroma.

References Cited in the file of this patent

UNITED STATES PATENTS

| | | |
|---|---|---|
| 341,759 | Lobeck | May 11, 1886 |
| 1,808,831 | Borg | June 9, 1931 |
| 1,892,449 | Dengler | Dec. 27, 1932 |
| 2,014,342 | Gutekunst | Sept. 10, 1935 |
| 2,287,444 | Morgenthaler | June 23, 1942 |